United States Patent [19]
Robinson

[11] 3,884,023
[45] May 20, 1975

[54] SELF-CLEANING RAKE

[76] Inventor: Melvin P. Robinson, P.O. Box 152, Benton, Ark. 72015

[22] Filed: Mar. 1, 1974

[21] Appl. No.: 447,393

[52] U.S. Cl. .............................. 56/400.1; 294/50
[51] Int. Cl. ............................................. A01d 7/10
[58] Field of Search ........................... 294/50, 50.5; 56/400.08–400.10, 400.03, 400.21, 400.2

[56] References Cited
UNITED STATES PATENTS

| | | | |
|---|---|---|---|
| 992,394 | 5/1911 | Wall | 56/400.08 X |
| 1,887,659 | 11/1932 | Paxson | 56/400.08 |
| 1,981,488 | 11/1934 | Wikander | 56/400.1 X |
| 2,539,590 | 1/1951 | Perzynski | 56/400.1 |

Primary Examiner—Louis G. Mancene
Assistant Examiner—J. N. Eskovitz
Attorney, Agent, or Firm—Cushman, Darby & Cushman

[57] ABSTRACT

A lawn broom having tines with downwardly turned or depending front ends is provided with a cleaning member slidably movable over the tines. The cleaning member surrounds the tines and is pivotally connected to a bracket which is in turn secured to a rod displaceable along the handle of the broom by means of a hand actautor. The cleaning member is arranged to move over the downwardly turned or depending front ends of the tines by virtue of the pivotal connection to the bracket. The entire tine portion of the broom may thereby have impaled material dislodged by the cleaning member. The cleaning member also compresses the tines when it is moved downwardly over the tines so that the lawn broom has a narrower profile, which facilitates the cleaning of leaves, etc., from areas such as hedges or other close quarters.

8 Claims, 7 Drawing Figures

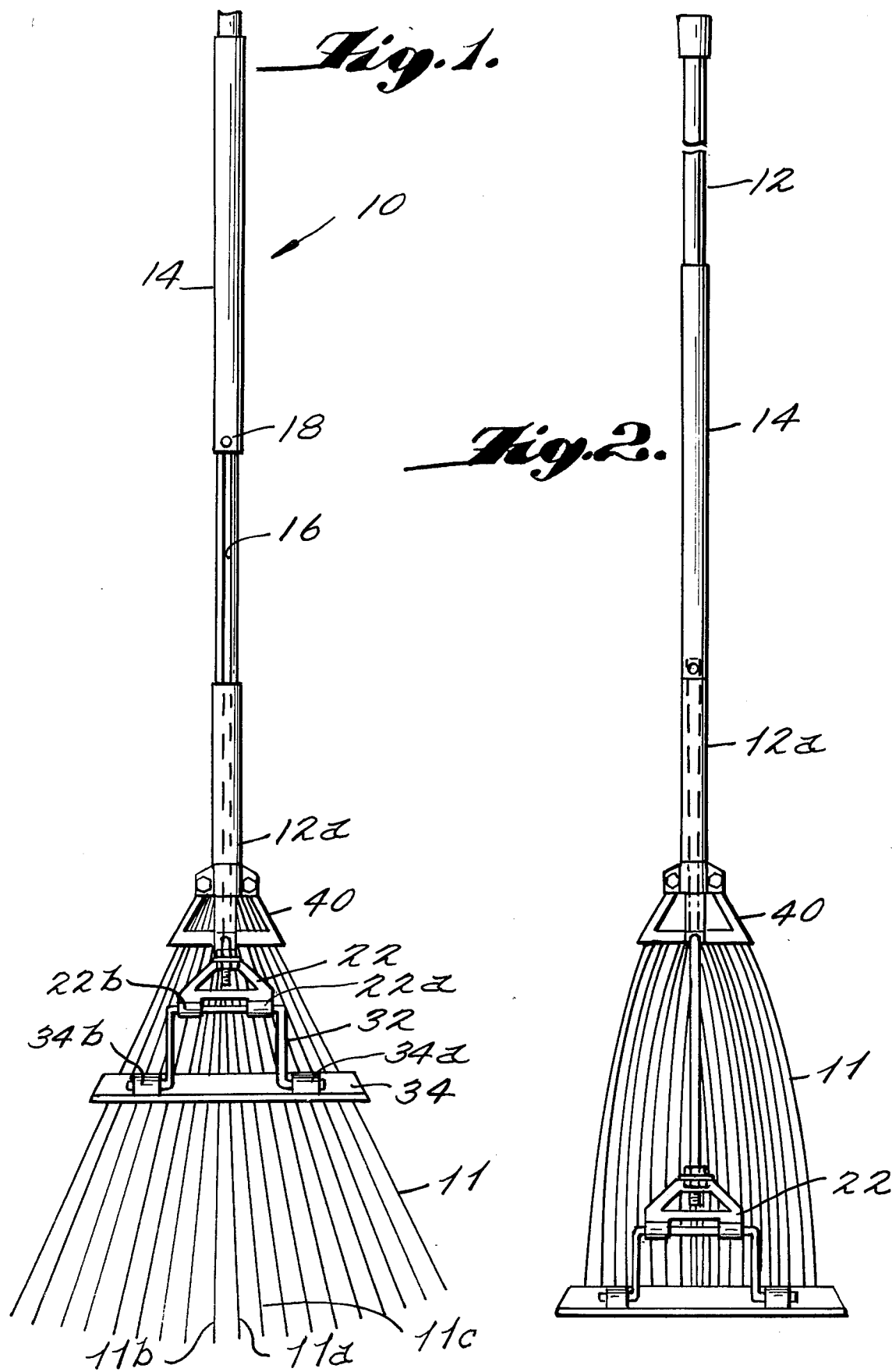

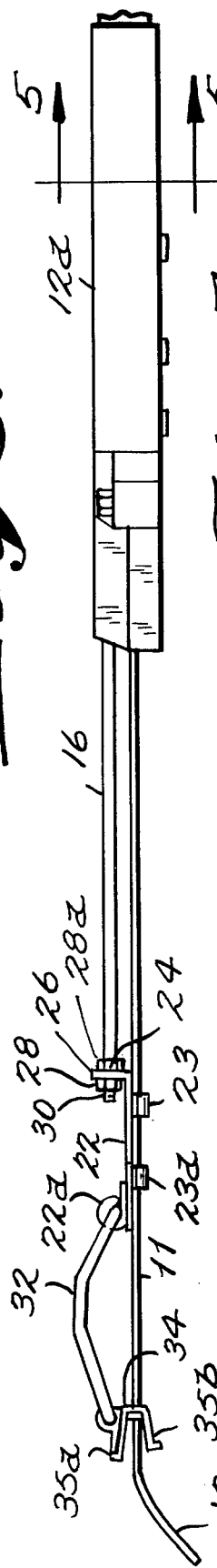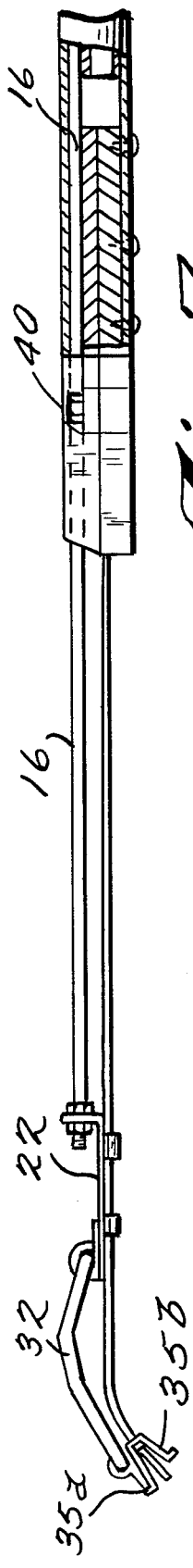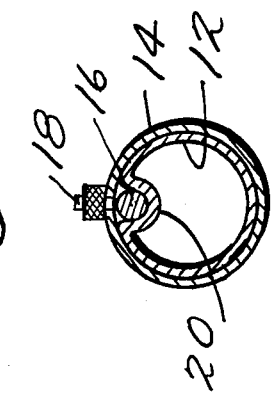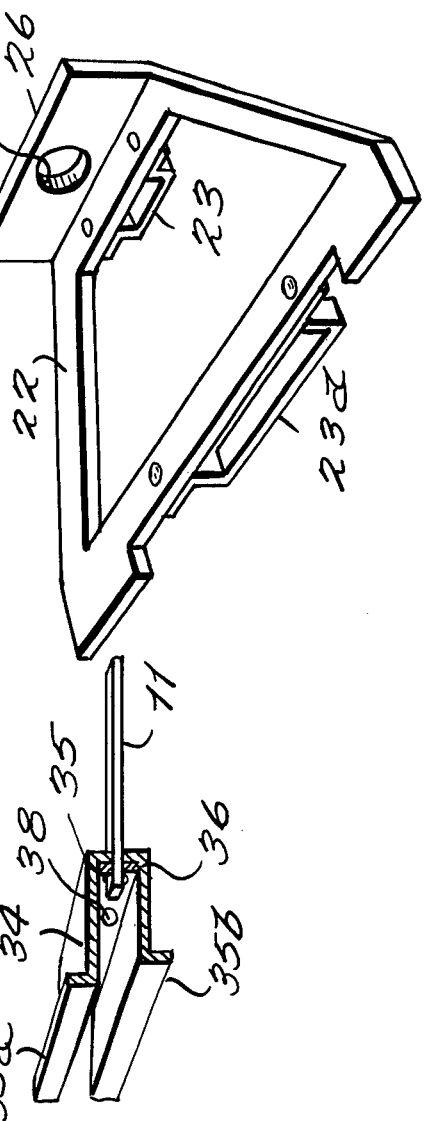

SELF-CLEANING RAKE

BACKGROUND OF THE INVENTION

A. Field of the Invention

This invention relates to a lawn broom or rake, and more particularly to a lawn broom which has a slotted guide bar or cleaning member slidable over the teeth or tines of the broom to clean off leaves, grass, etc., which have become entrapped in the tines.

The rake as contemplated by the present invention embodies a hand actuator located on the broom handle which is adapted to move a rod connected to a slotted guide bar. The guide bar has tines inserted therethrough and is slidable over downwardly turned or depending front ends of the tines, thereby ensuring that all materials lodged in the tines will be removed. The hand actuator is also slidable upwardly along the handle so that the slotted guide bar may be moved away from the downwardly turned front ends of the tines. A novel construction of the present invention resides in the employment of a pivotal member which connects the slotted guide bar to the rod. This pivotal guide member enables the slotted guide bar to be moved along the straight portion of the tines and also over the downwardly turned front ends. In previous cleanable rakes, no provision have been made for the slotted guide bar to be moved over the downwardly turned front ends. Thus, it is apparent that lawn or yard materials could become lodged between the downwardly turned front portions of the tines. The present invention also enables the transverse narrowing of the tines as the slotted bar is moved downwardly towards the front of the tines during the cleaning operation.

B. Description of the Prior Art

Self-cleaning rakes as such are well known in the art. For instance, in U.S. Pat. No. 1,981,488, there is disclosed a rake cleaning device which utilizes a slidable handle on a rake which co-acts with a leaf spring to move a U-shaped cleaning member over rake teeth. However, the cleaning member moves only over rake teeth which are pointed in a perpendicular direction to the rake handle and it is not contemplated by U.S. Pat. No. 1,981,488, to provide for a cleaning member which also moves over rake teeth or tines parallel to the rake handle.

Another example of a rake which utilizes a slidable cleaning plate is set forth in U.S. Pat. No. 2,213,694. This paatent sets forth a "broom" type rake which has a plurality of resilient wire teeth and further uses a wire tension spring provided for urging the plate forwardly to its cleaning position. A rear end of the spring is secured to the handle of the rake by means of bolts. It can be readily seen that U.S. Pat. No. 2,213,694 does not provide for a cleaning plate on a broom type rake which may be used to clear impaled material on the longitudinal tines as well as the curved portions of the tines by movement of a slidable actuator on the handle of the rake.

Further examples of cleanable rakes are disclosed in U.S. Pat. Nos. 3,258,903 and 2,149,429. In 3,258,903, a rake is shown which uses a carrier member slidably arranged on a handle wherein the carrier member carries tines and by use of a thumb-screw may be secured to the handle in a plurality of positions. At the forward end of the handle is arranged a guide member which is slotted to fit over a plurality of tines. In order to use the guide member to clean off material on the tines, the thumb-screw is loosened and the guide member is slid either upwardly or downwardly along the handle thereby moving the tines through the guide member and consequently dislodging any material lodged in the tines. In U.S. Pat. No. 2,904,951, a yard broom is shown which provides for a guide bracket to be slidably engaged with a plurality of tines to effect a cleaning result. However, no provision is made for the cleaning guide bar to be slidably engagable with angularly bent teeth arranged at the forwardmost end of the tines.

The instant invention patentably distinguishes over the above prior art by providing for a self-cleaning yard broom which is operated by urging a slidable actuator on a handle, wherein the actuator is connected by a rod to a pivotal attachment which is secured to a slotted guide bar on tines. By sliding the actuator downwardly over the handle, the slotted guide bar may be moved over the downwardly turned front ends of the yard broom and thereby completely clean off the front end teeth. The slidable guide bar is able to clean horizontal portions of the tines as well as the inwardly turned front portions because the guide bar is pivotally attached to a rod moved longitudinally by the actuator handle. The pivotal attachment provides for the slotted guide bar to be swung or pivoted from a horizontal cleaning position to a position substantially in the vertical direction over the downwardly turned front end portions of the rake. None of the above prior art patents employ such a novel pivotal movement.

SUMMARY OF THE INVENTION

It is therefore an object of the present invention to provide for a self-cleaning yard broom which may be manually operated to clean off both horizontal and vertical portions of the broom tines.

It is another object of the present invention to provide for a self-cleaning yard broom which utilizes a guide bar having slots through which tines are inserted to enable the guide bar to be moved over the yard broom tines by connection with a pivotal member.

Still another object of the present invention is to provide for a slidable actuator substantially encircling a yard broom handle which may be used to actuate a longitudinal rod substantially encompassed within the handle to impart pivotal movement to a slotted guide bar for cleaning off material impaled on the tines of the yard broom.

It is yet another object of the present invention to provide for a cleanable yard broom which utilizes relatively inexpensive materials.

Additional objects of the present invention reside in the specific construction of the exemplary apparatus hereinafter particularly described in the specification and shown in the several drawings.

BRIEF DESCRIPTION OF THE DRAWINGS

Further additional objects and advantages will become apparent as consideration is given to the following detailed description of a preferred embodiment of the invention as is illustrated in the accompanying drawings forming part of this specification and wherein like characters of reference indicate corresponding parts in the different figures.

FIG. 1 is a top view of the yard broom with the slotted guide bar in its upwardmost position.

FIG. 2 is a view showing the compressesd or collapsed position of the tines when the slotted guide bar is in a downwardly placed cleaning position.

FIG. 3 is a slide view of the yard broom showing the slotted guide bar in a position just before it is to be pivoted over the downwardly turned front end of the tines.

FIG. 4 is a side view showing the slotted guide bar substantially over the downwardly curved front end of the tines.

FIG. 5 is a cross-sectional view taken along lines 5–5 of FIG. 3 showing the relationship of the handle, slide actuator, and slidable rod.

FIG. 6 is a section of the slotted guide bar showing a metal plate secured within the slotted guide plate.

FIG. 7 is a view of the hinge bracket.

DETAILED DESCRIPTION OF THE INVENTION

Referring to FIGS. 1 and 2, there is illustrated the preferred embodiment of the present invention. A rake is generally designated at 10, and includes a handle 12, which supports a slidable actuator 14. The sidable actuator 14 is linked or secured to a rod 16 by means of a pin 18. From a consideration of FIG. 5, it can be seen that rod 16 is slidable within an indentation or groove 20 in the handle 12. In the preferred embodiment, it is contemplated that slidable actuator 14 will encircle both the handle 12 and rod 20 but could conceivably be designed to encircle only a portion of the handle 12.

Viewing FIG. 3, it can be seen that rod 16 is secured to hinge bracket 22 by the insertion of rod 16 through an aperture 24 located in a first end or flange portion 26 of hinge bracket 22. Hexagonal nuts 28 and 28a are threadably secured to threads 30 on rod 16 to secure flange 26 to rod 16.

Hinge bracket 22 may be generally triangular in shape, and utilizes two bent-over portions 22a and 22b on a second end of bracket 22 which pivotally secure or hinge a pivot rod or arm 32 therein. With reference to FIG. 1, it can be seen that pivot rod 32 is also pivotally secured to a cleaning member or slotted guide bar 34. The slotted guide bar 34 also has bent-over portions 34a and 34b to provide for a pivotal securing of the two ends of pivot rod 32. Further, in FIGS. 3 and 4, there is shown slotted guide bar 34 having an upper segment 35a which extends forwardly of lower segment 35b. The extension is to ensure that the lower segment 35b does not catch on the curved or downwardly depending front end 13 of the tines 11 when slotted guide bar 34 is moved rearwardly from its front most position. Hinge bracket 22 also utilizes lower extensions 23 and 23a slidably engaged on tines 11 to prohibit hinge bracket 22 from being elevated off the tines 11 when the slotted guide bar is in its furthermost downward position. It is contemplated that lower extension 23 will encompass a middle tine 11a while lower extension 23 will encompass a middle tine 11a while lower extension 23a will encompass middle tine 11a and tines 11b and 11c.

As hereinbefore stated, a novel feature of the present invention resides in the action of pivot rod 32 when slidable actuator 14 is disposed downwardly over handle 12. As illustrated in FIG. 3, the position of slotted guide bar 34 is shown just preceding its downward movement over downwardly depending front ends 13 of the tines 11. Here, pivot rod 32 has not provided for any pivot action, but as shown in FIG. 4, slotted guide bar 34 has been pivoted over downwardly depending front ends 13 by virtue of the pivot action of rod 32 being pivotally secured in the bent-over portions 34a, 34b, 22a and 22b. Also, it is to be noted that the lower segment 35 b of the slotted guide bar 34 will not reach the end of the curved portion 13 of the tines 11. This feature is of importance because as the slidable actuator 14 is displaced upwardly along handle 13 from its downwardmost position, lower segment 35b of slotted guide bar 34 tends to pivot in a clockwise direction because of the action of pivot rod 32. Thus, it can be readily appreciated that if lower segment 35b does not reach the end of the curved portion 13, then segment 35b cannot drag on the end of curved portion 13 of the tines on the backstroke after cleaning.

Another feature of the present invention is shown in FIG. 2. As the slotted guide bar 34 is displaced downwardly over the tines 11, the tines are collapsed or compressed inwardly from their original fan shape to a more rectangular shape. This compressing action aids in dislodging impaled lawn or garden material from the tines. The primary function of a displaceable slotted guide bar is to push or force off impaled material and the compressing action of the slotted guide bar aids in the cleaning process.

A further feature of the slotted guide bar 34 is shown in the fragmentary view of FIG. 6. A plate 36 with holes or slots 38 corresponding to the holes 35 of slotted guide bar 34 is secured by rivets or other appropriate means to the slotted guide bar. Plate 36 is contemplated as being constructed of steel and will not wear down as readily as would slotted guide bar 34 which is made of aluminum. Hinge bracket 22 and pivot rod 32 are also advantageously constructed of aluminum, with hinge bracket 22 in the preferred embodiment stamped from one-half inch aluminum. Slotted guide bar 34 may also be constructed from one-half inch aluminum, but different materials could also be used. An upper bracket 40, constructed of aluminum or machined steel, secures the tines 11 to lower handle support 12a. Handle 12 and lower handle support 12a may also be made from aluminum or steel tubing.

As stated previously, slidable actuator 14 may be disposed downwardly over handle 12 so that the tines 11 become compressed towards each other. If slidable actuator 14 is manually held at a desired position along handle 12, there will thereby be a corresponding narrowing of the tines 11 so that leaves, etc., may be cleaned out of hedges or in other tight areas where a wide rake would prove difficult to use.

The foregoing specific embodiments have also been described for the purpose of illustrating the principles of the present invention, and the same is subject to modification without departure therefrom. Therefore, the invention includes all modifications encompassed within the the spirit and scope of the appended claims.

What is claimed is:

1. A lawn broom having a handle connected to a plurality of tines having downwardly depending front ends, comprising:
   a. rod means disposed longitudinally and adjacent to said handle;
   b. actuator means linked to said rod means and slidably engaged with said handle for displacing said rod means longitudinally along said handle;
   c. cleaning means substantially surrounding said tines and disposed substantially transverse thereto for moving over said tines and said downwardly depending front ends; and d. means for pivotally connecting said rod means to said cleaning means comprising a hinge bracket and an arm means, said hinge bracket having a first end thereof secured to said rod means and a second end thereof pivotally connected to said arm means, said arm means also being pivotally connected to said cleaning means so that when said actuator means is disposed downwardly along said handle said cleaning means is correspondingly displaced downwardly over said tines and pivotally moved over said downwardly depending front ends to thereby remove material lodged on said tines, said cleaning means also being movable away from said downwardly depending front ends by displacing said actuator means upwardly along said handle.

2. The lawn broom as described in claim 1, wherein said handle further comprises an indented portion running longitudinally along the length of said handle for providing a support for said slidable rod means, said actuator means being linked to said rod means with a fastening pin and substantially surrounding said handle and rod for a predetermined distance longitudinally of said handle.

3. The lawn broom as described in claim 2 wherein said first end of said hinge bracket secured to said rod comprises a flange portion provided with an aperture to slide over said rod, said rod being further provided with a threaded end and a fastening means to secure said flange portion to said rod means.

4. The lawn broom as described in claim 3 wherein said second end of said hinge bracket has a bent-over portion providing a pivotal hinge for said arm means.

5. The lawn broom as described in claim 4 wherein said cleaning means has an upper and a lower plate, said upper plate having a bent-over portion providing a further pivotal hinge for said arm means.

6. The lawn broom as described in claim 5 wherein said upper plate extends beyond said lower plate, so that said lower plate will not bind on said downwardly depending front ends of said tines when said cleaning means is displaced in an upward direction after having been first displaced to its maximum downward positon.

7. The lawn broom as described in claim 6 wherein said hinge bracket further comprises lower extensions, a first extension surrounding a middle tine and a second extension surrounding three middle tines, sain extensions preventing said hinge bracket from elevating away from said tines when said cleaning means is downwardly displaced over said downwardly depending front ends.

8. The lawn broom as described in claim 7 wherein said hinge bracket, said cleaning means and said arm means are constructed of aluiminum.

* * * * *